Aug. 22, 1967   H. BECKMANN   3,336,750
ROCKET AND METHOD OF PROPELLING SAME

Filed May 24, 1963   2 Sheets-Sheet 1

INVENTOR.
HEINRICH BECKMANN
BY

United States Patent Office 3,336,750
Patented Aug. 22, 1967

3,336,750
ROCKET AND METHOD OF PROPELLING SAME
Heinrich Beckmann, Aachen, Germany, assignor to
Polysius G.m.b.H., Neubeckum, Germany
Filed May 24, 1963, Ser. No. 283,085
Claims priority, application Germany, Mar. 6, 1962,
B 66,235
1 Claim. (Cl. 60—217)

The present invention relates to an improved rocket and a method of propelling same.

The principle of rocket propulsion is known. A particular feature is the independence of the rocket propulsion from the surroundings. Of the various rocket propelling systems in which, in a combustion chamber by the combustion of an oxidizer and a fuel, gases are produced as propellents which at high speed pass through a nozzle, in particular two main methods and corresponding devices have been developed, namely the liquid fuel propelled rocket and the solid fuel propelled rocket.

With the liquid propelled rocket, oxidizer and fuel are liquids which are separately conveyed into a combustion chamber where their combustion takes place. The combustion gases escape at high velocity and furnish the thrust.

The device consists of two containers, one for the oxidizer and one for the fuel. From these containers, the liquids are either by a pumping installation conveyed into a combustion chamber which is separated from the interior of the rocket, or the liquids are, by means of a gas under pressure which does not react with the liquids, pressed into the combustion chamber. The gas under pressure, in this instance, acts so as to speak as a piston and pushes the liquid ahead of the gas. No intermixture between gas under pressure and liquid will occur. The fuel containers are, in this instance, designed as pressure containers which are under the pressure prevailing in the combustion chamber. The combustion chamber merges with a Laval nozzle.

With the solid fuel propelled rocket, oxidizer and fuel are combined to a solid substance. By intermixture and heat treatment, a pourable mass is obtained from oxygen and fuel containing, generally pulverous ingredients, to which are added small quantities of various chemicals which produce specific properties of the solid substance. The said pourable mass is poured into cylindrical forms so as to furnish cylindrical sections with free surface portions in the interior thereof. In operation, the said solid cylinders burn, preferably at the inner surface thereof, and the thus produced combustion gases pass at high velocity through a nozzle and thus furnish the thrust.

As will be evident from the description of the method, the design of a solid fuel propelled rocket is extremely simple. With such a rocket, the interior of the shell receives and holds the individual solid substance cylinder sections. Thus, the rocket simultaneously forms the outer shell and the combustion chamber which ends in a nozzle.

In spite of the obvious simplicity in construction, the solid fuel propelled rocket has some important drawbacks.

In contrast to the liquid fuel propelled rocket, in which the propellents are delivered by pumps from containers into a combustion chamber separated from the interior of the rocket, while the fuel container is not under the pressure prevailing in the combustion chamber, the interior of a solid fuel propelled rocket is under the pressure prevailing in the combustion chamber and is exposed to the effect of the high temperature in the combustion chamber.

Whereas, with the liquid propelled rocket, the diameter of the fuel containers may be only slightly less than the free inner diameter of the rocket body, inasmuch as a rather immaterial cross section is required for the feeding lines which feed the liquid fuel from the containers to the combustion chamber, with a solid fuel propelled rocket a considerably larger cross section is necessary for the fuel which is already in gaseous condition. The space requirement of a solid fuel propelled rocket is thus less favorable. The ratio of solid substance volume to the volume of the rocket is approximately 0.6 and in most favorable conditions is 0.9 while in less favorable condition it may be as low as 0.3.

The combustion process of the solid substance is greatly influenced by the pressure in the combustion chamber and is also very much dependent on the temperature of the solid mass. The course of the combustion over the time can be calculated only on the basis of results ascertained from test series. Therefore, a high factor of uncertainty is inherent to the operation of solid fuel propelled rockets.

A control of the thrust is not possible. By correspondingly shaping the free burning surface of the solid fuel cylinder sections, it is thus possible to predetermine the thrust only over a certain total time but not within periods of said total time.

When the rocket is stored over a longer period of time, the sensitivity of the solid mass to changes in temperature is making itself felt. The mass becomes brittle and tears or plastically deforms and will then considerably differ during the burning process from the precalculated behavior.

It is, therefore, an object of the present invention to provide a rocket and method of operating the same, which will represent a considerable improvement over heretofore known rockets and methods of operating the same.

It is a further object of this invention to provide a rocket which is neither a solid fuel propelled rocket in the conventional meaning nor a liquid fuel propelled rocket while avoiding the drawbacks of the solid fuel propelled rocket and maintaining the advantages of the liquid fuel propelled rocket.

These and other objects and advantages of the invention will appear more clearly from the following specification in connection with the accompanying drawings, in which:

FIG. 1 diagrammatically illustrates a section through a rocket according to the present invention.

Figure 1:
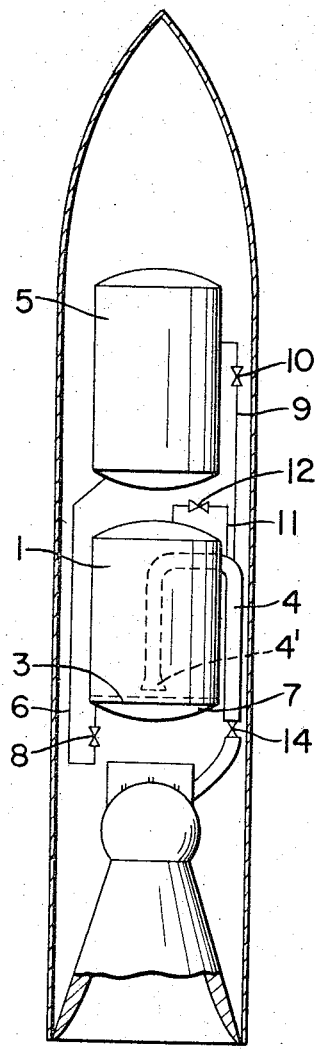

The present invention is characterized primarily in the employment of at least one or two substances in powder form as oxidizer and/or fuel. In both instances (one or two pulverous substances), the pulverous substance is conveyed into the combustion chamber from a receiving container which is designed as delivery or pressure container. This is effected by means of a gas under pressure in a separate container without the aid of mechanically driven pumps or the like through a pipe line, either a common pipe line or separate pipe lines. The pulverous substance, in this instance, is fluidized by the gas under pressure and is thus conveyed so to speak like a fluid while an intimate intermixture occurs between the gas under pressure and the pulverous substance.

The gas under pressure is simultaneously energy carrier for the transporting work to be performed for conveying the pulverous substance and, in case only one pulverous substance is employed, also acts as oxidizer or fuel. If two pulverous substances are employed (oxidizer and fuel) the gas under pressure may form a portion of the oxidizer or of the fuel.

With a liquid propelled rocket, oxidizer and fuel are likewise conveyed by gas under pressure. Gas under pressure in this instance acts as piston which means it reaches the combustion chamber without being intermixed with the liquid and thus cannot be used in two-fold manner. In this instance, it is merely energy carrier for transporting the liquid. In contrast thereto, in the present case, an intermixture of the two pulverous substances which is favorable for the combustion process is obtained in the common transport conduit from the container to the combustion chamber. This intermixture may be aided by a mixing chamber (ante-chamber) in front of the combustion chamber.

If it is non-permissible, fear of reaction, that the pulverous substances contact each other under normal conditions or are adjacent to each other, both substances are conveyed to the mixing or combustion chamber through separate conduits.

The control of the total quantity of oxidizer and fuel to be conveyed to the combustion chamber, and the selection and composition of the mixture of oxidizer and fuel is possible within a wide range, while adapting the delivery to the pressure in the fuel combustion chamber and considering other outer influences. This may be accomplished by correspondingly proportioning the quantity of gas under pressure fed into the container for the pulverous substance, by proportioning the quantity of gas under pressure which is passed directly from the storage container for the gas under pressure into the feeding line, and by proportioning the quantity of gas passing from the upper portion of the container for the pulverous substance into the feeding line.

When the ratio of oxidizer to fuel, in case two pulverous substances are employed, does not have to be varied and the presence of both pulverous substances adjacent each other will in normal condition not cause a reaction therebetween, both substances may be filled successively into one and the same receiving container. Prior to firing the rocket, a portion of the gas under pressure brings about an intermixture and homogenization in the receiving container. This homogenization may also be effected by a gas supply installation outside the rocket. After the homogenization has been completed, the gas under pressure stored in the rocket feeds the mixture of oxidizer and fuel into the combustion chamber as described above.

The arrangement for carrying out the method of operating a rocket propulsion installation by means of one pulverous and one gaseous substance or by means of two pulverous substances and one gaseous substance may be designed as follows:

Referring first to FIG. 1, with an arrangement operating with one pulverous and one gaseous substance, the device comprises a receiving container 1 for the oxidizer or fuel, which receiving container is designed as pressure container. To this end, the lower portion of the container 1 has a porous bottom 3. The feeding line 4 for the mixture of gas and powder is designed as immersion pipe and extends into the container 1 in such a way that at the end portion of the immersion pipe, the longitudinal axes of the feeding line and of the container coincide. The flaring end 4' of the immersion pipe is spaced from the bottom 3 of the container 1 in such a way that a sufficient flow cross-section will be obtained between bottom 3 and the mouth of pipe 4 for the mixture of powder and gas flowing in the container in radial direction thereof directly above the porous bottom 3.

The energy carrier required for the feeding operation is stored as gas under pressure in a pressure container 5. The pressure container 5 communicates through a pipe line 6 with an air chamber 7 provided in the container 1 below the porous bottom 3. Outside the air chamber there is provided a controllable valve 8 through which the gas under pressure has to pass on its way from container 5 through conduit 6 into chamber 7. There is also provided a conduit 9 with an adjustable valve 10 through which gas under pressure can pass from container 5 directly into the feeding line 4 without having to pass through the powder in container 1. In addition thereto, there is provided a connecting line 11 between the upper portion of container 1 which is free from material, and the feeding line 4. In this way, a certain portion of gas under pressure which has entered container 1 and has found its way through the contents of container 1 can pass through conduit 11 into the feeding line 4 through an adjustable valve 12. The various valves may be controlled by impulse transmitters in the rocket or by remote impulse transmitters.

Figure 2:
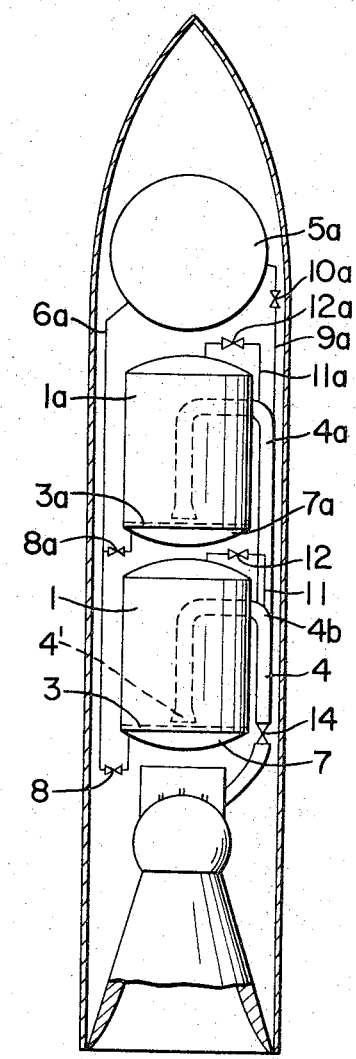
FIG. 2 is a diagrammatic section similar to that of FIG. 1 of a modified rocket according to the invention.

With reference to FIG. 2, when operating with two pulverous substances, as oxidizer and fuel, and a gaseous substance which is under pressure and serves both as energy carrier for the transport of the pulverous substances and also may form a part of the oxidizer or fuel, the device will, in contrast to the arrangement of FIG. 1, have two pulverous substance receiving containers, 1 and 1a, with porous bottoms 3, 3a. In a manner similar to container 1 of FIG. 1, container 1a has an immersion pipe or feeding line 4a extending thereinto, which communicates with pipe 4 at 4b. The energy carrier is stored as gas under pressure in container 5a which communicates through a pipe line 6a and valves 8, 8a with the chambers 7, 7a of containers 1, 1a. A conduit 9a leads via an adjustable valve 10a into feeding line 4a for passing gas under pressure directly thereinto, while a connecting line 11a with a control valve 12a leads from the top of container 1a into feeding line 4a, similar to line 11 communicating with feeding line 4 in FIG. 1. In all other respects the rocket according to FIG. 2 corresponds to that of FIG. 1. Line 4a may also lead into the ante or combustion chamber separately, i.e. may not join the feeding line 4 of container 1.

Figure 3:
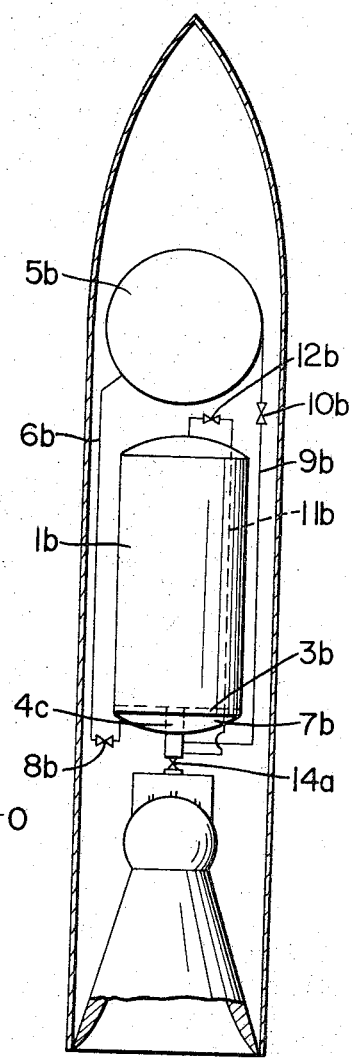
FIG. 3 represents a diagrammatic section through still another modification of a rocket according to the invention.

If the oxidizer and the fuel, i.e. both pulverous substances, are intermixed prior to the starting operation of the rocket, and if during the operation the composition of the pulverous substances is non-variable, the arrangement may be designed in the manner shown in FIG. 1 or in FIG. 3. The arrangement shown in FIG. 3 is similar to that of FIG. 1, similar elements being designated with the same reference numerals but with the suffix b. However, the arrangement of FIG. 3 differs from that of FIG. 1 in that the feeding line 4c is not designed as immersion pipe but leads from the porous bottom 3b directly downwardly into the mixing chamber via an adjustable valve 14a. It is, of course, to be understood that the rocket is provided with customary features as for instance filling openings on the containers for filling the same with pulverous substances.

The drawing and foregoing description merely set forth examples. The specific arrangement will, of course, be dictated by the respective requirements.

The methods described above have in common the feature of the simultaneous and possible employment of the gas under pressure as conveying means and entirely or partially as oxidizer or fuel. They have further in common the feature of the intimate intermixture of gas under pressure and pulverous substances while said substances are being conveyed to the combustion chamber.

Fundamental is the case in which the gas under pressure is an oxidizer or a fuel and the other substance is in pulverous condition in the receiving container 1. When valve 8 (or 8a, 8b) is opened, the gas passes into the air chamber 7 (or 7a, 7b) and passes in a finely distributed condition through the porous bottom into the pulverous material and first collects in the upper portion of the container 1 (or 1a, 1b) which is free from material. When the feeding pressure is reached which is obtained in the stationary condition of the feeding operation, the feeding valve 14

(or 14a) is opened, and the powder is passed through the respective immersion pipe and feeding line into the combustion chamber where the combustion is initiated by conventional ignition means.

The control is effected by impulse transmitters which act upon the adjustable valves. This control permits the creation of each desired condition within the working range according to FIG. 4.

Figure 4:
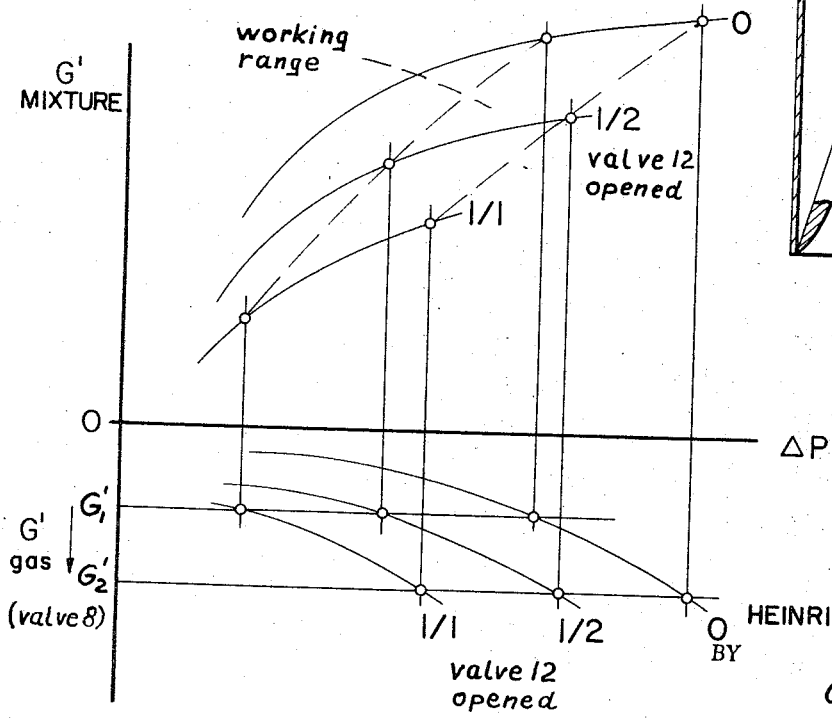
FIG. 4 is a graph illustrating the influence of controlling the path and quantity of fuel to the combustion chamber of the rocket.

More specifically, with regard to FIG. 4, if a predetermined amount of gas under pressure $G'_{gas}$ is introduced into the chamber 7 of container 1, the delivery of the mixture of the pulverous material in container 1 and gas ($G'_{mixture}$) is such that a constant amount of this mixture is transported to the combustion chamber of the rocket. Depending on the resistance of the conduit 4, a definite delivery pressure $\Delta p$, i.e. the pressure difference between the outlet cross section of conduit 4 and the pressure in the interior of container 1 is obtained. If the amount of gas $G'_{gas}$ becomes smaller, also the delivered quantity $G'_{mixture}$ becomes smaller and the delivery pressure $\Delta p$ decreases. This relationship is valid for a fixed position of valve 12 in bypass conduit 11, for instance the closed position indicated by "O" in FIG. 4.

If valve 12 is opened for instance half way as indicated by the position 1/2 in FIG. 4, a portion of the gas entering the chamber 7 of container 1 passes into the space above the pulverous material in container 1 and is discharged through bypass conduit 11 into conduit 4. Under these conditions, with the same amount of gas $G'_{gas}$ introduced into chamber 7, the delivered quantity $G'_{mixture}$ and the delivery pressure $\Delta p$ are smaller than if valve 12 were closed.

The above outlined conditions are illustrated in the diagram of FIG. 4 in which the amount of gas $G'_{gas}$ introduced into the chamber 7 of container 1 is plotted over the delivery pressure $\Delta p$ below the abscissa and the delivered quantity of gas and pulverous material $G'_{mixture}$ is plotted over the delivery pressure $\Delta p$ above the abscissa. The curves shown in FIG. 4 have been verified by numerous tests and are also in conformity with calculations made in this connection.

For two limit values of the amount of gas $G'_{gas}$ introduced into chamber 7, which are indicated by two parallel horizontal lines $G'_1$ and $G'_2$, the corresponding points on the curve for the valve position O of valve 12 and for the curve representing the valve position 1/1, i.e. completely opened valve 12, confine the working range in which the delivery device operates and which is controllable by adjustment of valve 12.

It may be mentioned that, of course, a certain portion of the total amount of gas $G'_{gas}$ introduced into chamber 7 remains in container 1 following the delivery of the pulverous material. In other words, a somewhat smaller amount of gas leaves container 1 than was introduced thereinto. If, however, with the completion of the delivery operation the delivery conduit 4 is not closed, the entire amount of gas is discharged from container 1 through conduit 4.

It is, of course, to be understood that the present invention is, by no means, limited to the particular arrangement shown in the drawings and method described above, but also comprises any modifications within the scope of the appended claim.

What I claim is:

The method of operating a rocket by supplying fuel and oxidizer means including a pulverous material and a gas to the combustion chamber means of a rocket engine, which comprises the steps of: conveying the gas from a source thereof under pressure to a body of the pulverous material in a direction opposite to that in which gravity and acceleration forces act on the pulverous material during the operation of said rocket to form a fluid mixture of the gas and the pulverous material, and delivering at least a portion of the fluid mixture so formed to the combustion chamber means, said body of pulverous material consisting of a first section of one substance and a second section of another substance and the step of passing a gas through said body of material in a direction opposite to the direction of gravity affecting homogenization of the pulverous material prior to commencing delivery thereof to said combustion chamber.

References Cited

UNITED STATES PATENTS

| | | | |
|---|---|---|---|
| 2,636,642 | 4/1953 | Gorin | 222—195 X |
| 2,890,843 | 6/1959 | Attinello | 60—39.46 X |
| 2,924,489 | 2/1960 | Beckmann | 302—29 X |
| 3,173,252 | 3/1965 | Ziegenhagen | 60—39.47 X |
| 3,256,688 | 6/1966 | Hill | 60—204 X |

FOREIGN PATENTS 646,363   8/1962   Canada.

MARK NEWMAN, *Primary Examiner.*

D. HART, *Assistant Examiner.*